June 12, 1951 P. PETERSON 2,556,738
METHOD OF FORMING AUTOMOBILE BODY FENDERS
Filed April 21, 1949 3 Sheets-Sheet 1
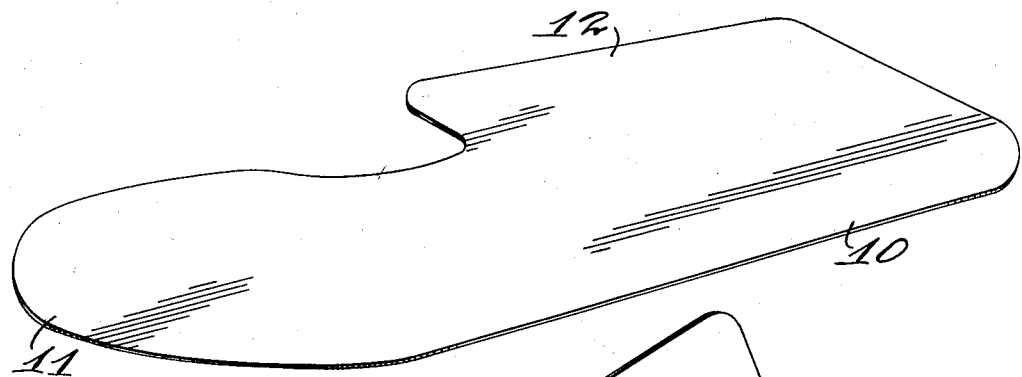
FIG-1-
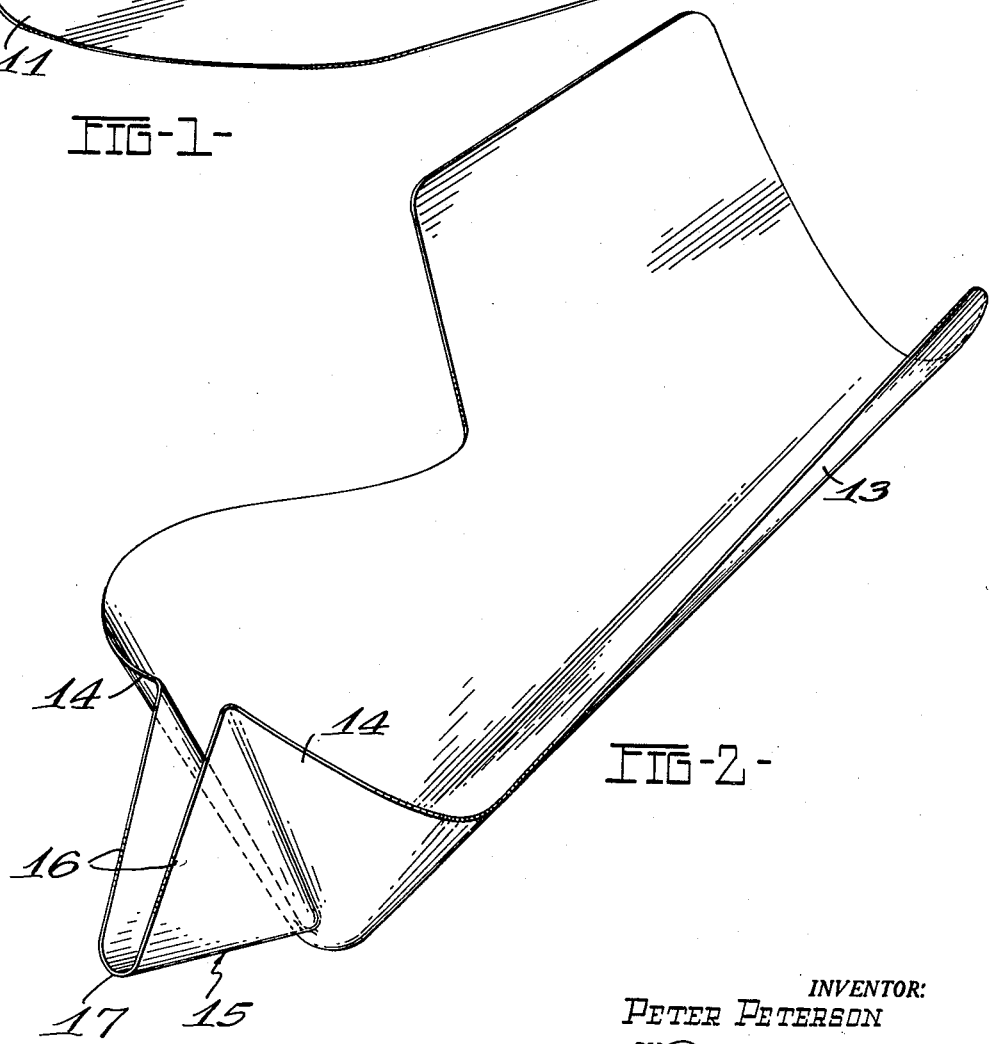
FIG-2-
INVENTOR:
PETER PETERSON
BY
ATTY.

June 12, 1951   P. PETERSON   2,556,738
METHOD OF FORMING AUTOMOBILE BODY FENDERS
Filed April 21, 1949   3 Sheets-Sheet 2
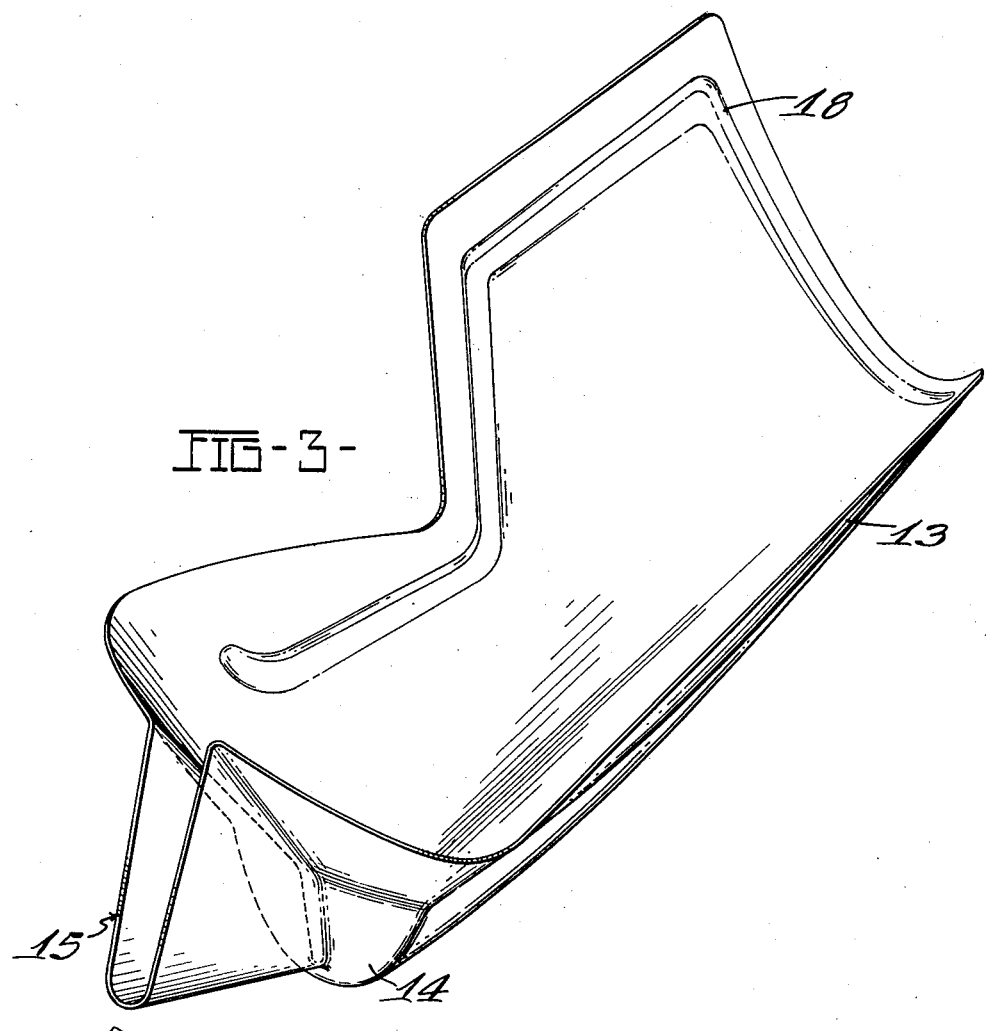
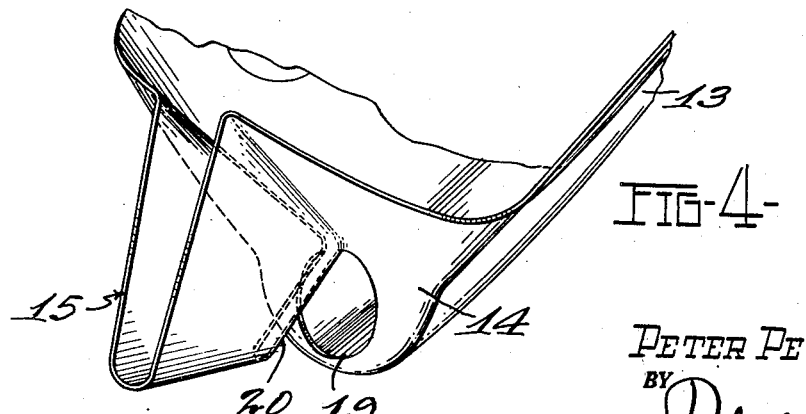
INVENTOR:
PETER PETERSON.
BY
ATTY.

June 12, 1951  P. PETERSON  2,556,738
METHOD OF FORMING AUTOMOBILE BODY FENDERS
Filed April 21, 1949  3 Sheets-Sheet 3
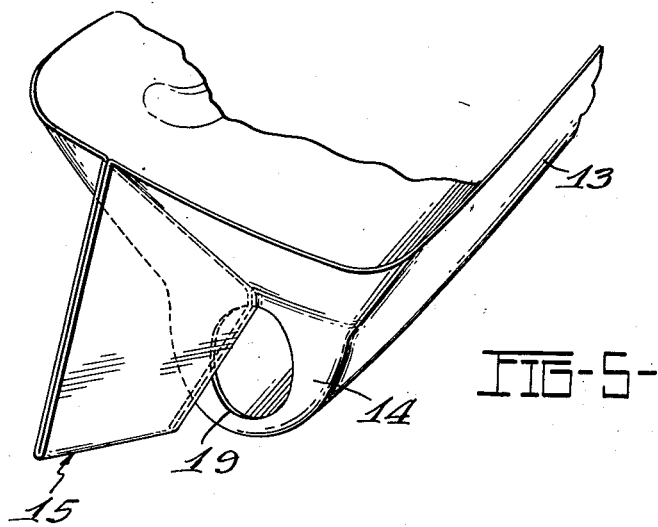
FIG-5-
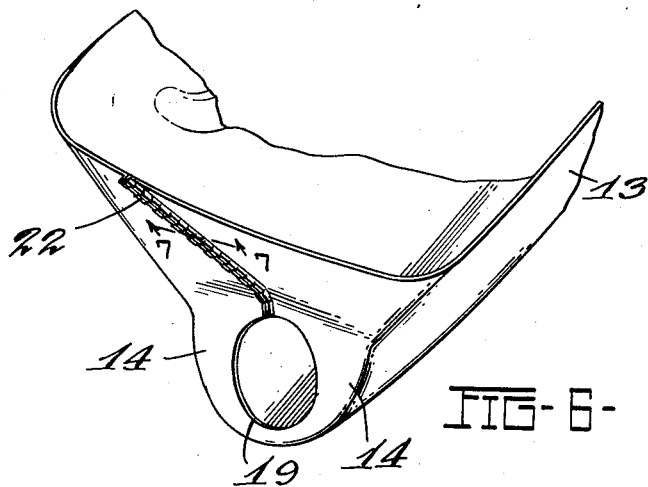
FIG-6-
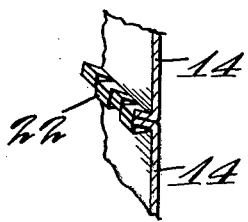
FIG-7-
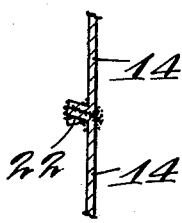
FIG-8-
INVENTOR:
PETER PETERSON.
BY
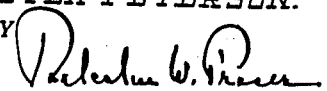
ATTY.

Patented June 12, 1951

2,556,738

UNITED STATES PATENT OFFICE 2,556,738

METHOD OF FORMING AUTOMOBILE BODY FENDERS

Peter Peterson, Toledo, Ohio, assignor to The City Auto Stamping Company, Toledo, Ohio, a corporation of Ohio Application April 21, 1949, Serial No. 88,769

4 Claims. (Cl. 113—116)

This invention relates to vehicle body members, but more particularly to the production of members such as fenders from a single blank.

Heretofore, vehicle fenders have been produced in sections, which after being properly formed are welded together, but this is objectionable because it not only involves loss of metal by the very nature of the seaming process as well as the trimming necessary for the individual sections, but also requires more time for assembly as well as additional finishing work for concealing the seams in the completed fender. In some instances, fenders are formed from a single sheet which is repeatedly drawn and redrawn, either hot or cold, until the desired shape is achieved but this is limited to relatively simple shapes and is objectionable because of the thinning out or weakening of the metal.

Another method has involved blanking, preforming and welding prior to the drawing operation. This has proven unsatisfactory because not infrequently the welded seams, or the metal adjacent the seams, do not stand up during the subsequent drawing step, and as a result, such fenders are a total loss. Furthermore, welding equipment from time to time fails for one reason or another, and this is a serious handicap in a production line, because the entire line must be shut down until the welding equipment is made ready to operate. Thus, welding is objectionable at any of the early stages in fender manufacture because of the unreliability of the welded seam and the fickleness of welding equipment.

An object is to produce a simple and efficient method of making vehicle body members, such as fenders, from a single blank of sheet metal in such manner that the member is completely formed with a minimum reduction of the metal thickness before seaming or welding is required and the latter is reduced to a minimum, thereby to secure maximum strength in the finished piece.

In one aspect of this invention, the vehicle body member is formed by preliminarily forming the sheet metal blank in such manner that it has the general contour of the member with an open double-walled gusset at one end. Then the member is drawn to the desired shape. Thereafter, the gusset is folded together to bring the walls thereof into intimate contact, whereupon the excess metal of the gusset is trimmed close to the body member to leave a pair of relatively narrow abutting flanges. Finally, after the member is trimmed and completed, the abutting flanges are seamed or welded, this being the final step in the manufacture of the body member.

For purposes of illustration but not of limitation, an embodiment of the invention is shown on the accompanying drawings, in which Figure 1 is a perspective view of the sheet metal blank from which the fender is made;

Figure 2 is a bottom perspective view of the preforming step by which the blank is formed close to the finished shape of the fender with the front wall sections and showing the integral double-walled gusset between these sections;

Figure 3 is a bottom perspective view of the fender showing the next succeeding step or the shape of the fender after the drawing operation;

Figure 4 is a fragmentary perspective view showing the next step in which the hole for the head lamp is punched through the end wall sections, a portion of the double-walled gusset adjacent thereto being removed;

Figure 5 is a top fragmentary perspective view of the fender showing the next succeeding step in which the side walls of the double-walled gusset are pressed together into intimate engagement;

Figure 6 is a top fragmentary perspective view of the finished fender after the gusset has been trimmed;

Figure 7 is an enlarged sectional view on the line 7—7 of Figure 6; and

Figure 8 is a sectional view similar to Figure 7 but after the welding operation but before the final grinding step.

The illustrated embodiment of the invention comprises a sheet metal blank 10 which has a reduced end portion 11 having curved edges and a lateral extension 12 forming a part of one side of the blank. The particular shape of the blank 10 varies with different desired fender shapes.

After the blank is cut, it is then formed in such manner that it can be subsequently introduced into the draw and form die close to the finished shape of the fender. Consequently, in the forming operation, the blank is curved transversely throughout its length as indicated at 13, and the end portion 11 of the blank is folded in such manner as to form a pair of end wall sections 14 which extend about at right angles to the adjacent wall portions and provide between the two end wall sections 14 an open double-walled gusset 15 consisting of a pair of outwardly extending substantially triangular walls 16 integrally connected by a curvilinear wall 17. With the partially shaped fender in this form, it is then introduced into the draw and form die where the metal is drawn or stretched into the desired shape as indicated on Figure 3, thereby somewhat rounding out the end wall sections 14 and somewhat deepening the structure and providing the usual lines of beading 18 which extend around the fender a short distance from the free edges as shown and control the metal flow during drawing operation. During this operation, the gusset 15 remains in its open position. The importance of the double-walled gusset will be recognized by those skilled in this art. It affords a gathering of the excess metal, which otherwise would interfere with the drawing step.

In the event that the fender is to be used at the front of the automobile and a head lamp is to be incorporated in it, the next step is to pierce or cut a hole 19 through the end walls 14, preferably one-half of the hole being pierced from each end wall section. At the same time, the inner portion of the double-walled gusset 15 adjacent the end wall sections is cut away as indicated at 20 on Fig. 4. It is to be understood that the head lamp hole 19 is in this instance, rough pierced, but at any later time, it may be repierced and finished in the usual manner.

In the next step, the side walls 16 of the gusset 15 are pressed toward each other and forced into intimate engagement throughout, thereby to bring the edges of the end wall sections 14 into intimate contact to provide substantially a continuous end wall for the fender. Specifically, the opposite sides of gusset 16 are firmly gripped or clamped in order to retain the shape and configuration thereof as illustrated in Fig. 3, and thereafter, by a progressive camming action through a medium of dies, the material of each gusset side wall is caused to gradually close the gap and simultaneously bring these gusset walls into engagement with each other to the position shown in Fig. 5. This brings the gusset walls into engagement with each other without in any way affecting the shape of the fender shown in Fig. 3. This is illustrated on Figure 5. After that step, the fender may be trimmed to the final shape and any rough edges or surfaces ground to smoothness.

The next step is illustrated on Figures 6 and 7. It will be seen that the side walls of the gusset are trimmed close to the fender end wall sections to provide relatively narrow abutting flanges 22 and at the same time that the gusset walls are cut longitudinally, they are also cut transversely so that the flanges are formed into a series of tabs. Simultaneously with the cutting operation, alternate tabs are forced in opposite directions, thereby mechanically to secure the end wall sections 14 together. This is the final step before the welding operation. As a consequence, after the gusset has been trimmed and the tabs formed and bent, as above indicated, the fender may be stored or carried to another station for the welding operation. It will thus be seen that welding may be performed at any subsequent time without interfering with the production line.

In the final operation, the relatively short tabs or flanges 22 are fused together and sufficient metal is thereby provided to effect a satisfactory weld without requiring additional welding rod. After welding, the seam may be ground down so as to be flush with the surface of the fender.

According to the above method, it will be manifest that the fender can be efficiently and economically produced. By arranging the welding step as the final step in the method, difficulties above mentioned are eliminated not only with working on the fender after welding operation, but also the unreliability of welding equipment. Another feature of importance is that since all operations are done with the metal in its virgin state, any loss will be negligible and also but a small reduction of the thickness of the metal is encountered.

It is to be understood that the above embodiment is merely illustrative and changes in details may be effective without departing from the spirit of the invention especially as defined in the appended claims.

What I claim is:

1. A method of making an elongate trough-like fender having an end wall generally transverse to the length thereof which comprises providing a sheet metal blank of substantially greater length than width, forming the blank to provide a transversely curved, elongate body having trough-like side walls and end wall sections extending from said side walls at one end of said body and connected along inner edges by an integral folded gusset which takes up excess metal, drawing the portion of the blank other than the gusset to finished fender shape, closing the walls of the gusset together, trimming the metal of the gusset walls close to the end wall sections to produce adjacent edge portions, and securing the adjacent edge portions together.

2. A method of making an elongate trough-like fender having an end wall generally transverse to the length thereof which comprises providing a sheet metal blank of substantially greater length than width, forming the blank to provide a transversely curved, elongate body having trough-like side walls and end wall sections extending inward from side walls at one end of said body and connected along inner edges by an integral folded gusset which takes up excess metal, drawing the portion of the blank other than the gusset to finished fender shape, closing the walls of the gusset together, trimming the metal of the gusset walls close to the end wall sections to produce edge portions to be welded, welding the edge portions together, and grinding the seam flush with the surface of the fender.

3. A method of making an elongate trough-like fender having an end wall at substantially right angles to the length thereof which comprises providing a sheet metal blank of substantially greater length than width, forming the blank to provide a transversely curved, elongate body having trough-like side walls and end wall sections extending substantially right-angularly inward from said side walls at one end of said body and connected along inner edges by an integral folded gusset which takes up excess metal, drawing the portion of the blank other than the gusset together, trimming the metal of the gusset walls close to the end wall sections to produce flanged edge portions to be welded, welding the flanged edge portions together, and grinding the seam flush with the surface of the fender.

4. A method of making an elongate trough-like fender having an end wall at substantially right angles to the length thereof which comprises providing a sheet metal blank of substantially greater length than width, forming the blank to provide a transversely curved, elongate body having trough-like side walls and end wall sections extending substantially right-angularly inward from side walls at one end of said body and connected along inner edges by an integral folded gusset which takes up excess metal, drawing the portion of the blank other than the gusset to finished fender shape, closing the walls of the gusset together, trimming the metal of the gusset walls close to the end wall sections to produce flanged edge portions, forming tabs in the flanged edge portions and bending the tabs in opposite directions to insure that the flanged portions are held together suitable for welding, and welding the flanged edge portions together.

PETER PETERSON.

REFERENCES CITED

The following references are of record in the file of this patent:

UNITED STATES PATENTS

| Number | Name | Date |
|---|---|---|
| 2,166,226 | Vehko | July 18, 1939 |